(12) United States Patent
Travostino

(10) Patent No.: US 10,129,772 B1
(45) Date of Patent: Nov. 13, 2018

(54) ANTICIPATORY NETWORKING

(71) Applicant: Apple Inc., Cupertino, CA (US)

(72) Inventor: Franco Travostino, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/594,737

(22) Filed: May 15, 2017

(51) Int. Cl.
*H04W 24/02* (2009.01)
*H04L 29/08* (2006.01)
*H04L 12/24* (2006.01)

(52) U.S. Cl.
CPC ......... *H04W 24/02* (2013.01); *H04L 41/0813* (2013.01); *H04L 67/306* (2013.01)

(58) Field of Classification Search
CPC ...... H04L 67/26; H04N 21/251; H04W 24/02
See application file for complete search history.

(56) References Cited

U.S. PATENT DOCUMENTS

2013/0173796 A1* 7/2013 Grab ............. H04N 21/251
  709/225
2017/0041413 A1* 2/2017 Chandhok ............. H04L 67/26

* cited by examiner

*Primary Examiner* — Myron K Wyche
(74) *Attorney, Agent, or Firm* — Sterne, Kessler, Goldstein & Fox, PLLC

(57) ABSTRACT

Embodiments for performing an anticipatory networking are provided. These embodiments include detecting an action taken by a user of a wirelessly-enabled device, an automated action of the wirelessly-enabled device, or a current condition of the device; learning what future operations the wirelessly-enabled device will likely need to perform in order to carry out the desired user action or device action; creating a user profile based on the learned information; and proactively performing, based on the user profile, certain downstream operations before the data corresponding to those operations is actually needed. In some embodiments, the anticipatory networking techniques disclosed herein essentially represent the confluence of networking concepts and machine learning concepts, and as such, enable wireless communications having reduced latency, while also improving network reliability and device performance.

20 Claims, 5 Drawing Sheets

| Downstream Operation / Interrupting Event | Op 1 | Op 2 | Op 3 | Op 4 | Op 5 | Op 6 | Op N |
|---|---|---|---|---|---|---|---|
| Event 1 | ✓ |  | ✓ | ✓ |  | ✓ |  |
| Event 2 |  | ✓ | ✓ | ✓ | ✓ |  | ✓ |
| Event 3 | ✓ | ✓ | ✓ | ✓ |  |  | ✓ |
| Event 4 |  |  |  | ✓ | ✓ | ✓ |  |
| Event N |  |  |  |  |  |  |  |

User Profile
300

*FIG. 3*

ANTICIPATORY NETWORKING

FIELD

This disclosure generally relates to wireless communications, and more specifically to performing anticipatory networking to improve network latency issues.

BACKGROUND

Related Art

Consumer electronic devices have become an important part of people's everyday lives. These electronic devices include everything from cellphones, laptops, tablets and smartwatches to digital assistants and other wearables. More recently, many consumer electronic devices have been adapted to include wireless communication capabilities, such that these devices can communicate and coordinate with one another, as well as with wireless access points, cellular base stations, and end servers. For example, with the increasingly widespread availability and use of wirelessly-enabled electronic devices, individuals may now be able to perform tasks, such as make and receive phone calls, stream music and video, browse the internet, and interact with a plethora of applications ("apps") all from the individuals' personal wirelessly-enabled devices.

While these capabilities are certainly indicative of the advancements made in the wireless communications industry over the last decade, two significant issues have been, and continue to be, the bottleneck for rapid future advancement in this industry. These two issues can be generally categorized as bandwidth limitations, and network latency issues. Over the past several years, various techniques have been developed to address the first of these issues: bandwidth limitations. These techniques include, for example, combining communication channels to increase overall bandwidth, implementing traffic scheduling schemes, and implementing traffic prioritization schemes. Each of these techniques, along with others, have to some extent helped address the long standing bandwidth limitation issues, and have helped ultimately usher in the past few generational advancements in the wireless communications indust—e.g., 2G to 3G, 3G to 4G, and the impending transition from 4G to 5G.

However, the second issue that has been a constant bottleneck for advancement in the wireless communication industry—network latency—has proven to be a much more difficult problem to solve. Network latency generally refers to the amount of time that it takes for a packet of data to get from one point to another, and is generally measured by calculating the time that it takes for a packet to make one round trip from its origin point to its destination, and back. This is generally referred to as the packet's round trip time ("RTT"). Because network latency is tied to the fundamental concept of how long it takes for a data packet to travel between two points, and because that time generally varies based on the current conditions of the air interface between the two points (e.g., having to account for delays associated with dropped packets), the wireless communication industry has largely been unable to reduce these delay times, outside of minor incremental improvements.

Moreover, network latency issues are compounded by the fact that many actions implemented on today's wirelessly-enabled devices require, and are dependent upon, multiple downstream operations. For example, when a user opens a weather application on their wirelessly-enabled device, that action may also prompt certain downstream operations, each of which may require their own packet transmissions, and thus their own round trip delays. Such downstream operations can include, for example, obtaining the wirelessly-enabled device's current location, generating targeted advertisements for the user, and/or obtaining the user's account information (if they have an existing account within the application). Each of these downstream operations generally do not begin until the data corresponding to these operations is actually requested, and these data requests usually occur in a sequential fashion (e.g., the data request may not occur until a corresponding upstream action has been completed). Therefore, a delay in such a data request (or a delay in a corresponding upstream action) will necessarily cause a corresponding delay in completing the downstream operation. As such, network latency issues are particularly prevalent in today's sophisticated wirelessly-enabled devices.

Currently, there are no existing solutions that are capable of addressing these network latency issues, especially where the network latency issues stem from round trip delays associated with dependent downstream operations.

SUMMARY

The present disclosure provides system, apparatus, method, and computer program product embodiments, and combinations and sub-combinations thereof, for performing anticipatory networking to improve latency issues.

In some embodiments, performing anticipatory networking may include: detecting an action taken by a user of a wirelessly-enabled device, an automated action of the wirelessly-enabled device, or a current condition of the device; learning what future operations the wirelessly-enabled device will likely need to perform in order to carry out the desired user action or device action; and proactively performing certain downstream operations before the data corresponding to those operations is actually needed. In some embodiments, the process of performing anticipatory networking is intended to be carried out by wirelessly-enabled devices such as cellphones and tablets, which may be used for numerous different actions, and may be subjected to many different conditions. However, the anticipatory networking embodiments herein are equally applicable to any network-connected device that could benefit from reduced network latency.

The anticipatory networking techniques disclosed herein are advantageous because, for example, they can reduce application start-up times and refresh times. The anticipatory networking embodiments disclosed herein also reduce unexpected delays caused by dropped data packets by ensuring that, if any data packets are indeed dropped during the various downstream operations, that those dropped packets occur during a proactive phase—e.g., before the data corresponding to those operations is actually needed. The disclosed anticipatory networking techniques also match different operations to advantageous networks (such as best possible networks in some embodiments), such that each corresponding data packet can be transmitted over the network that advantageously matches the operation's specific needs. Indeed, some operations may be best suited for Wi-Fi (e.g., data intensive operations), while for other operations, cellular may be a suitable communication mode (e.g., when minimal amounts of data need to be transmitted) when Wi-Fi is unavailable or unreliable. However, the quality of a particular network generally cannot be determined until data is actually transmitted over the network. Therefore, the anticipatory networking techniques disclosed herein allow for data corresponding to downstream operations to be transmitted over available networks during the proactive phase, such that advantageous or even the best possible network(s) are identified before the data corresponding to those operations is actually needed.

The anticipatory networking techniques disclosed herein may be applicable to several different types of wireless technologies, such as, without limitation, Wi-Fi, Bluetooth, radio-frequency identification (RFID), near field communications (NFC), 60 GHz communications, and cellular communication, as well as several different types of wirelessly-enabled devices.

In some embodiments, the process of performing anticipatory networking disclosed herein may include detecting an action taken by a user of a wirelessly-enabled device. User actions can include, for example, playing a song, initiating a phone call, or launching an application (e.g., a weather application, a map application, or a game). The disclosed anticipatory networking embodiments may also include detecting an automated action of the wirelessly-enabled device. Automated device actions can include automatically connecting to a known wireless access point, or automatically pinging a base station, to name just some examples. The disclosed process of performing anticipatory networking may also include detecting a current condition of the wirelessly-enabled device, such as the device's current location, the time of day where the device is located, whether the device is plugged in, or whether the device is in a moving vehicle.

The wirelessly-enabled device may then collect data relating to how the user typically interacts with the device, and what the user's preferences are for different applications running on the device and for different actions initiated on the device. The wirelessly-enabled device may also collect data relating to the condition of the device when each action was initiated. Using these pieces of data, the wirelessly-enabled device can learn how to best meet the user's needs, and in doing so, the wirelessly-enabled device can anticipate what future operations will likely be needed in order to carry out the desired user actions or device actions. Subsequently, based on this learning, the wirelessly-enabled device may be able to proactively perform certain downstream operations before the data corresponding to those operations is actually needed, thereby reducing network latency.

Therefore, the anticipatory networking techniques disclosed herein essentially represent the confluence of networking concepts and machine learning concepts, and as such, enable wireless communications having reduced latency, while also improving network reliability and device performance.

BRIEF DESCRIPTION OF THE DRAWINGS/FIGURES

Embodiments of the disclosure are described with reference to the accompanying drawings. In the drawings, generally, like reference numbers indicate identical or functionally similar elements. Additionally, generally, the left most digit(s) of a reference number identifies the drawing in which the reference number first appears.

FIG. 3 is a graphical representation of an exemplary user profile, according to some embodiments.

DETAILED DESCRIPTION

Figure 1:
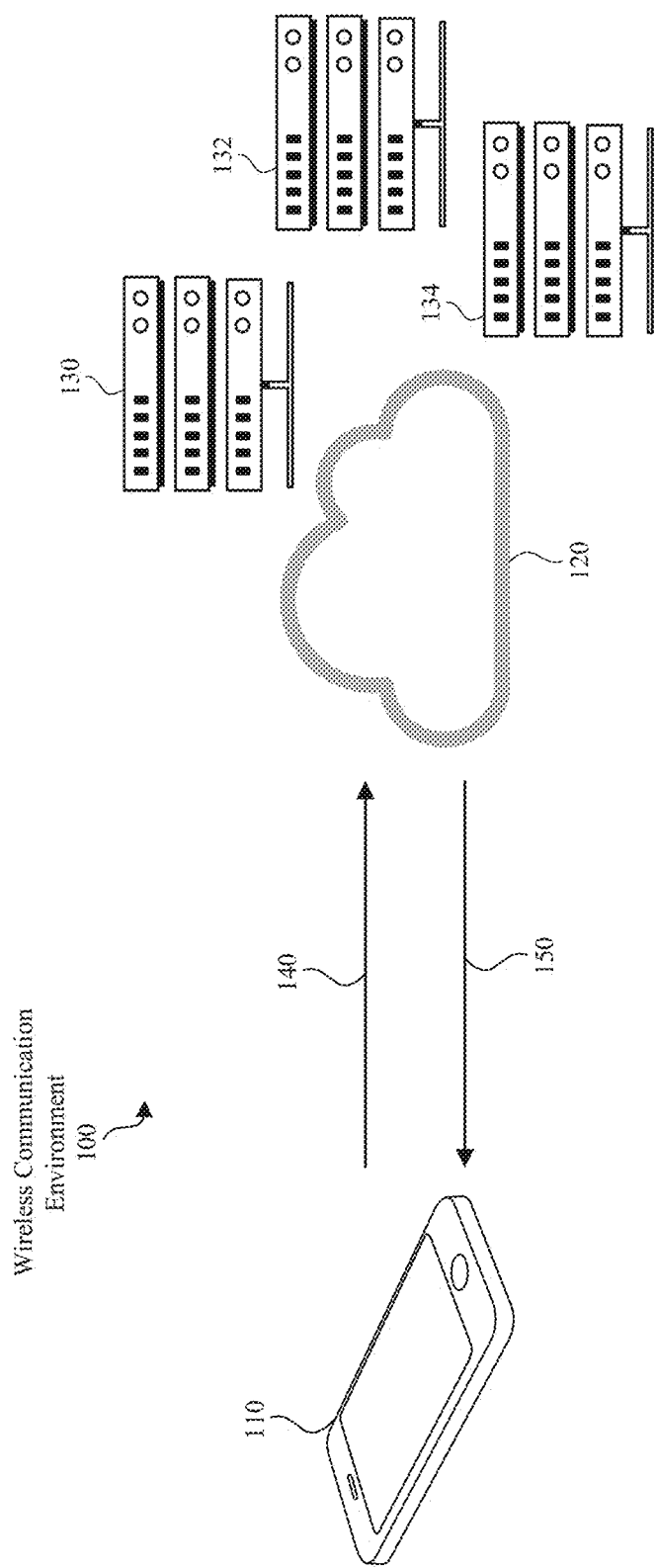
FIG. 1 illustrates a block diagram of a first wireless communication environment, according to some embodiments.

FIG. 1 illustrates a block diagram of a first wireless communication environment 100 according to some embodiments. A wireless communication environment 100 provides wireless communication of information and objects, such as one or more commands and/or data, between a wirelessly-enabled device 110, a networking element 120, and any number of servers, such as servers 130, 132, and 134. Those skilled in the relevant art(s) will recognize that wirelessly-enabled device 110 may be configured to communicate using any combination of Wi-Fi, Bluetooth, radio-frequency identification (RFID), near field communications (NFC), 60 GHz communications, cellular communication, or the like. Additionally, in some embodiments, wirelessly-enabled device 110 may be implemented as a standalone or a discrete device or may be incorporated within or coupled to another electrical device or host device, such as a cellphone, smartwatch, portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player, and could also be implemented as a key fob, or a household appliance, to name just some examples and/or any other suitable electronic device that will be apparent to those skilled in the relevant art(s) without departing from the spirit and scope of the present disclosure.

In an embodiment, wirelessly-enabled device 110 may be configured to transmit a first wireless signal 140 toward networking element 120 using any acceptable modulation scheme. Networking element 120 may be a component, or collection of components, that makes it possible for wirelessly-enabled device 110 to gain network access, and to ultimately access servers 130-134. For example, networking element 120 may represent a Wi-Fi access point, a cellular base station (e.g., macrocell base station, microcell base station, or femtocell base station), or the like. Networking element 120 may be configured to receive first wireless signal 140, process signal 140 and, if necessary, transmit a second wireless signal 150 back to wirelessly-enabled device 110. In this manner, wirelessly-enabled device 110 and networking element 120 exchange information ("communicate") with one another. The signals exchanged between wirelessly-enabled device 110 and networking element 120 may represent any number of different signals types, including: scanning signals (e.g., "beacons"), command signals, information requests, or data packets, to name just some examples.

Servers 130-134 may each represent a standalone network server, or they may represent different partitions of a single network server. In some embodiments, servers 130-134 may each individually, or collectively, function as a computer system that serves as a central repository of data and programs shared by users and/or devices in wireless communication environment 100. Servers 130-134 may represent any one of a file server, communications server, application server, database server, and/or domain server, to name some examples. Moreover, three servers 130-134 are shown in FIG. 1 for illustrative purposes only. In some embodiments, wireless communication environment 100 may include more or less servers without departing from the spirit and scope of the present disclosure.

As an illustrative example, wirelessly-enabled device 110 may begin in an idle state where a user of wirelessly-enabled device 110 is not interacting with the device, where wirelessly-enabled device 110 is not currently performing automated functions, such as automatically connecting to a known wireless access point, and where a third party) individual or device is not currently attempting to communicate with the user through wirelessly-enabled device 110 (e.g., via an incoming phone call, an incoming SMS text message, or the like). Then, at some point in time, wirelessly-enabled device 110's idle state may be interrupted. In some embodiments, wirelessly-enabled device 110's idle state may be interrupted by several different events, such as: (i) the user of wirelessly-enabled device 110 initiating an action on the device; (ii) a third party individual or device attempting to communicate with the user through wirelessly-enabled device 110; and (iii) wirelessly-enabled device 110 performing an automated function. User actions taken on wirelessly-enabled device 110 can include, for example, playing a song, initiating a phone call, or launching an application (e.g., a weather application, a map application, or a game). Additionally, interrupting events initiated by third party individuals or devices can include, for example, an incoming phone call, an incoming SMS text message, an incoming email, or an incoming video call. Further, automated functions of wirelessly-enabled device 110 that can interrupt its idle state can include, for example, automatically connecting to a known wireless access point, or automatically pinging a base station. The foregoing are provided solely for illustrative purposes only, and this disclosure is not limited to those examples.

Once wirelessly-enabled device 110 detects that one of the above interrupting events has occurred, wirelessly-enabled device 110 then begins to collect data relating to the event and to the current condition of device 110. Such event-related data may include the type of event, parties involved in the event (e.g., automated, single user, or multiple users), device resources needed to carry out the action(s) requested by the interrupting event, and/or network resources needed to carry out the requested actions(s), to name some examples. Additionally, data relating to the current condition of wirelessly-enabled device 110 may include, for example, the device's current location, the time of day where the device is located, whether the device is plugged in, and/or whether the device is in a moving vehicle, to name some examples.

Once wirelessly-enabled device 110 collects this data relating to the interrupting event, wirelessly-enabled device 110 generally does one of two things. For example, wirelessly-enabled device 110 may either use the collected data to build a new user profile relating to how the user typically interacts with wirelessly-enabled device 110 after the detected interrupting event has occurred, or wirelessly-enabled device 110 may compare the collected data to an existing user profile to determine how wirelessly-enabled device 110 should respond to the detected interrupting event to meet the user's needs. In other words, once a user profile has been built, wirelessly-enabled device 110 may use the collected data to anticipate what downstream operations will likely be needed in order to carry out the desired user action(s) or device action(s), or to handle a third party communication request. In some embodiments, the process of collecting data relating to interrupting events, and building a user profile may be referred to as machine learning. Ultimately, using these machine learning techniques, wirelessly-enabled device 110 may be able to anticipate and proactively perform certain downstream operations before the data corresponding to those operations is actually needed, thereby reducing network latency.

In some embodiments, even when a profile already exists for the user of wirelessly-enabled device 110, the device may still use the collected data to update (e.g., refine) the existing profile. This updating process may help ensure that wirelessly-enabled device 110 is able to respond properly to interrupting events even as the user's preferences change over time.

For instances where a new user profile needs to be built, it may take wirelessly-enabled device 110 some period of time (such as approximately up to a week in some situations) before the user profile becomes viable and is able to provide accurate predictions for what downstream operations may be needed. Conversely, in situations where a user profile already exists, it may take a shorter period of time (such as approximately five minutes in some situations) to update the profile to account for newly collected data. In some embodiments, an existing user profile may be update daily, and the updating process may be programed to take place overnight. It may be beneficial to have the updating process take place overnight because the process may be relatively processor intensive, and the late night/early morning hours may offer the best chance for wirelessly-enabled device 110 to be plugged in and not in use. However, the user profile updating process may take place at other times, and at other frequencies, without departing from the spirit and scope of the present disclosure.

Additionally, or alternatively, wirelessly-enabled device 110 may be preloaded with a default user profile, such that the process of building a unique user profile from scratch may be avoided. In some embodiments, a default user profile may be preloaded on other wirelessly-enabled devices belonging to the same user (or owner) of wirelessly-enabled device 110.

When the disclosed machine learning techniques are applied to the wireless communication context—illustrated by wireless communication environment 100, for example—then wirelessly-enabled device 110 may then be capable of performing anticipatory networking. In some embodiments, anticipatory networking may allow wirelessly-enabled device 110 to reduce network latency by reducing delays caused by downstream operations relating to the particular interrupting event.

Figure 2:
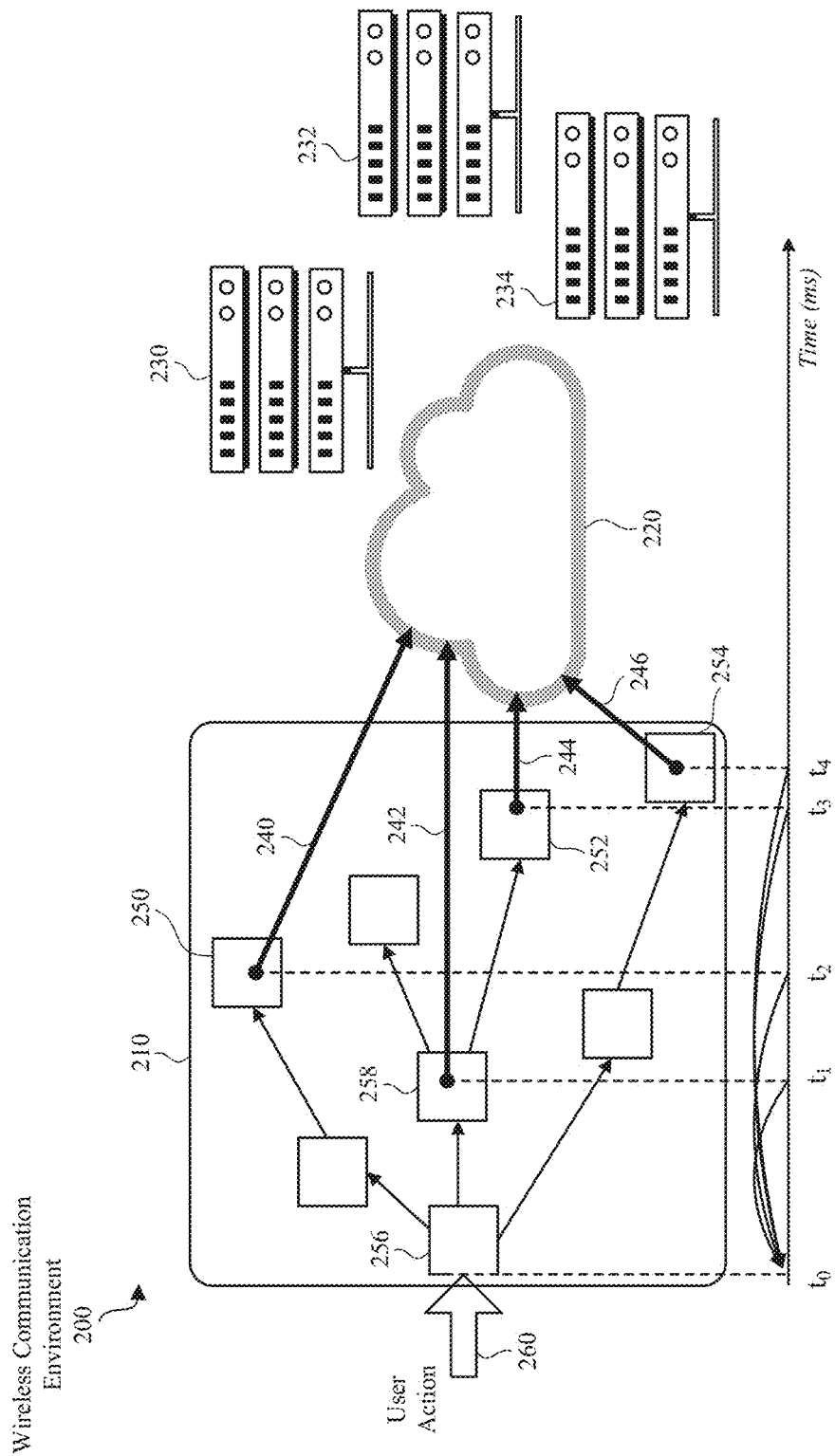
FIG. 2 illustrates a block diagram of a second wireless communication environment, according to some embodiments.

FIG. 2 illustrates a block diagram of a second wireless communication environment 200 according to some embodiments. The second wireless communication environment 200 may represent an exemplary embodiment of wireless communication environment 100 illustrated in FIG. 1, and as such, may provide wireless communication of information, such as one or more commands and/or data, between a wirelessly-enabled device 210, a networking element 220, and servers 230, 232, and 234. In the example embodiment shown in FIG. 2, wirelessly-enabled device 210 may be configured to transmit wireless signals 240, 242, and 246 toward networking element 220 using any acceptable communication protocol and modulation scheme. Wirelessly-enabled device 210 may represent an exemplary embodiment of wirelessly-enabled device 110, networking element 220 may represent an exemplary embodiment of networking element 120, and servers 230-234 may represent exemplary embodiments of servers 130-134. Therefore, an extensive discussion of the operational features that overlap between the network elements illustrated in FIG. 1 (e.g., wirelessly-enabled device 110, networking element 120, and servers 130-134) and the corresponding elements illustrated in FIG. 2 (e.g., wirelessly-enabled device 210, networking element 220, and servers 230-234) will be omitted from the discussion here. Instead, reference will be made to the similar operational features discussed with reference to FIG. 1, and the corresponding discussion from FIG. 1 will apply equally to the discussion of the elements in FIG. 2.

As similarly discussed above, wirelessly-enabled device 210 may start out in an idle state, but in some embodiments, that idle state may be interrupted at any point in time by an interrupting event. The interrupting event may take several different forms, including: (i) a user of wirelessly-enabled device 210 initiating an action on the device; (ii) a third party individual or device attempting to communicate with the user through wirelessly-enabled device 210; and/or (iii) wirelessly-enabled device 210 performing an automated function. However, for illustrative purposes, the anticipatory networking techniques performed by wirelessly-enabled device 210 will be discussed below in the context of the interrupting event being a user-initiated action. Importantly, however, the present disclosure is not so limited. Instead, the anticipatory networking techniques disclosed herein may be used to reduce network latency issues associated with any of the above-referenced as well as other examples of interrupting events.

As illustrated in FIG. 2, at a point in time (to), wirelessly-enabled device 210's idle state may be interrupted by a user action 260. As an illustrative example, user action 260 may represent a user deciding to play a song from the user's library through wirelessly-enabled device 210. As will be apparent to persons skilled in the relevant art(s) from the teachings herein, numerous downstream operations may need to be performed in order for user action 260 (e.g., playing a song using wirelessly-enabled device 210) to be carried out. For example, the user deciding to play a song from wirelessly-enabled device 210 may prompt wirelessly-enabled device 210 to: verify the user's music library credentials; check to see if new or variant songs, matching the user's chosen song, are available, check for any local upcoming concerts; and ultimately pull the necessary data from servers 230-234 to play the user's chosen song.

In some embodiments, these downstream operations may be performed by daemons 250, 252, and 254 running on wirelessly-enabled device 210. Daemons 250-254 may each represent a type of program designed to run on wirelessly-enabled device 210's operating system, and to run unobtrusively in the background, rather than under the direct control of the user. Daemons 250-254 may also be configured to be idle until being activated by the occurrence of an interrupting event. In an embodiment, daemons 250-254 may also be referred to as specialists.

The downstream options needed to carry out user action 260 may each require the retrieval of data from servers 230-234. For example, in order to verify the user's music library credentials (performed by daemon 250, for example), the user's credentials may need to be retrieved from servers 230-234. Additionally, in order to see if any local concerts are coming up (performed by daemon 252, for example), location information, concert venue information, and band tour information may need to be retrieved from servers 230-234. Finally, daemon 254, for example, may ultimately pull the necessary song data from servers 230-234. Because each of these downstream operations may require retrieval of data from servers 230-234, each of these operations may contribute to the overall network latency relating to user action 260.

As discussed above, network latency generally refers to the amount of time that it takes for a packet of data to travel from one point to another, and is generally measured by calculating the time that it takes for a packet to make one round trip from its origin point to its destination, and back. This is generally referred to as the packet's round trip time ("RTT").

As illustrated in FIG. 2, the downstream operations performed by daemons 250-254 may be dependent on other operations. In other words, certain downstream operations, which may be needed to carry out user action 260, may not begin until other operations are completed. For example, before checking for any local upcoming concerts (performed by daemon 252, for example), daemon 256 may first need to acquire wirelessly-enabled device 210's current location, and daemon 258 may need to check the user's music preferences and/or recently played songs, such that daemon 252 has the necessary band and location information to be able to retrieve the appropriate data from servers 230-234.

Therefore, instead of the downstream operations performed by daemons 250-254 being able to start at time $t_0$ (e.g., immediately following user action 260), these downstream operations may not commence until later in time (e.g., times $t_2$, $t_3$, or $t_4$, for example). These delayed start times, therefore, compound the overall network latency associated with user action 260. For example, if the downstream operations performed by daemons 250-254 were able to begin at time $t_0$, then the overall network latency for user action 260 may be approximately equal to the longest round trip time for these downstream options. However, due to the dependency of the downstream operations performed by daemons 250-254, the overall network latency for user action 260 may be approximately equal to time $t_4$ plus the round trip time associated with acquiring the necessary song data from servers 230-234 (performed by daemon 254 beginning at time $t_4$, for example).

Additionally, or alternatively, even if the downstream operations performed by daemons 250-254 were not dependent on other operations, in some embodiments those downstream operations may still not begin until the data corresponding to those operations is specifically requested. Such delayed requests may also increase the overall network latency associated with user action 260.

However, according to some embodiments, using the anticipatory networking techniques disclosed herein, the start times for certain downstream operations, such as those performed by daemons 250-254, may be allowed to commence at earlier points in time (e.g., times $t_0$ or $t_1$), thereby reducing the overall network latency associated with user action 260. Indeed, utilizing a user profile (either building a new user profile from data collected relating to user action 260 and to the current condition of wirelessly-enabled device 210, or using an existing user profile), wirelessly-enabled device 210 can anticipate what downstream operations will likely be needed to carry out user action 260. Therefore, instead of not realizing until time $t_2$ that the user's music library credentials are needed to carry out user action 260, or not realizing until time $t_3$ that a listing of upcoming local concerts are needed, these downstream operations can be anticipated, thereby allowing these operations to begin earlier in time (e.g., times $t_0$ or $t_1$) and before the data relating to those operations is actually needed.

In some embodiments, wirelessly-enabled device 210 may anticipate and proactively perform certain downstream operations based on various weighted threshold calculations. Indeed, wirelessly-enabled device 210 may determine the likelihood of a downstream operation being needed based on a user's existing user profile. The likelihood of a downstream operation being needed may represent a percentage chance of the operation occurring, or a total number of times that the operation has occurred, to name just some examples. The likelihood of a specific downstream operation being needed may then be weighed against the relative cost of performing an unnecessary downstream operation. Therefore, wirelessly-enabled device 210 may decide to proactively perform a downstream operation when the combination of the likelihood of the operation being needed and the relative cost of the operation satisfies a predetermined threshold. For example, if the likelihood that an operation will be needed is relatively low, e.g., 60%, that operation may still be performed if the cost of the operation is equally low, e.g., a DNS resolution (which generally only requires the transmission of a single data packet). However, a costly operation, such as obtaining credentials or setting up encryption, may require a relatively higher likelihood of occurring, e.g., 90%, before that downstream operation is proactively performed. This predetermined threshold may also be adjusted—e.g., during the user profile update process—to reflect recent correct and incorrect predictions.

As discussed above, in some embodiments, user action 260 may represent other actions besides the user playing a song on wirelessly-enabled device 210, such as opening a weather application, playing a game, making a phone call, or connecting to a Wi-Fi access point, to name just some examples. Additionally, user action 260 may represent an action that is self-contained on wirelessly-enabled device 210. For example, user action 260 may include a user scrolling through a list of contacts or songs, swiping to an alternate page of icons on wirelessly-enabled device 210, or unlocking wirelessly-enabled device 210. Wirelessly-enabled device 210 may also collect data relating to these self-contained actions to anticipate when the user might stop scrolling or swiping, and what action is likely to follow. In doing so, wirelessly-enabled device 210 may be able to predict what application the user may launch, what contact the user might call, or what playlist the user might select before those actions are actually taken.

The downstream operations illustrated in FIG. 2 may also be initiated by other interrupting events besides user actions including, for example, a third party individual or device attempting to communicate with the user through wirelessly-enabled device 210, or wirelessly-enabled device 210 performing an automated function. Moreover, the downstream operations discussed herein relating to user action 260 are presented for illustrative purposes, and are not intended to limit the scope of the present disclosure in any way. Indeed, numerous other downstream operations may be prompted by user action 260, and different combinations of downstream operations may be prompted when user action 260 represents a third party action, or an automated function of wirelessly-enabled device 210 without departing from the spirit and scope of the present disclosure. In some embodiments, the downstream operations illustrated in FIG. 2 may be user action dependent, meaning that the downstream operations that are capable of being proactively performed may vary from action to action.

Moreover, mobile applications can behave differently depending on the user that is interacting with them. As such, applications running on wirelessly-enabled device 210 may behave differently than applications running on a different user's device. Therefore, the downstream operations that are needed to carry out user action 260 (when user action 260 represents a user interacting with an application running on wirelessly-enabled device 210) may be different from the downstream operations that are needed to carry out the same action on a different user's device. Thus, the disclosed anticipatory networking techniques may be user dependent, and in some embodiments may be both user dependent and device depended, such that the disclosed anticipatory networking techniques may be adjusted to accurately reflect how a specific user interacts with a specific device.

In some instances, the data collected relating to how the user typically interacts with wirelessly-enabled device 210, and what the user's preferences are for different applications running on the device and for different actions initiated on the device may be applied to other devices belonging to the user. In other words, a user profile generated on wirelessly-enabled device 210 may be applicable, at least in part, to other wirelessly-enabled devices owned by the user. For example, information pertaining to how the user interacts with its music library or weather application on wirelessly-enabled device 210 (e.g., a cellphone) may be useful in helping anticipate and proactively perform downstream operations in response to the user playing music or opening a weather application on a different device (e.g., a tablet or wearable). In some embodiments, the user profile generated on wirelessly-enabled device 210 may be shared with other devices belonging to the user by accessing a shared cloud storage, for example.

Further, the disclosed anticipatory networking techniques may vary based on a current condition of wirelessly-enabled device 210. Therefore, the downstream operations that are needed to carry out user action 260 may be different depending on the current condition of wirelessly-enabled device 210. For example, the user of wirelessly-enabled device 210 may interact with the device differently when the user is on vacation, when it is late at night, or when the user is driving. Indeed, the user may want a Virtual Private Network ("VPN") to be established for actions when the user travels to a location that is particularly susceptible to security breaches, and/or the user may not want advertisements, or music related information displayed while they are driving. Therefore, as discussed above, the user's profile also takes into account these device conditions, and thus allows proactive performance of downstream operations to be varied accordingly.

Other downstream operations that may be implicated by the anticipatory networking techniques disclosed herein, and that may be performed before the data relating to those operations is actually needed, include, for example:

Domain Name Resolution ("DNS Resolution"): DNS resolution refers to the task of converting domain names, in textual form, to their corresponding IP address, generally represented by a string of numbers and decimals points. In some instances, a DNS resolution may include a daemon within wirelessly-enabled device 210 sending a request to a domain server (e.g., server 230) for an IP address that corresponds to a given domain name. Using the anticipatory networking techniques disclosed herein, wirelessly-enabled device 210 may anticipate what domain names may ultimately be implicated by user action 260, and may perform the DNS resolutions before the corresponding IP addresses are actually needed. In this way, the desired IP address(es) may have already been retrieved (e.g., at time $t_0$) from server 130 before the IP address(es) is even requested, which may not occur until time $t_1$, $t_2$, or $t_3$.

Virtual Private Network ("VPN") Establishment: VPN establishment refers to the process of setting up a private network that extends across a public network. By establishing a VPN, users can send and receive data across shared or public networks as if their devices were directly connected to the private network. Applications running across the VPN may therefore benefit from the functionality, security, and management of the private network. As one example, a VPN may be beneficial when using wirelessly-enabled device 210 to access a corporate email account or file server. Using the anticipatory networking techniques disclosed herein, when a user opens their banking application on wirelessly-enabled device 210, wirelessly-enabled device 210 may anticipate that a VPN needs to be established. Wirelessly-enabled device 210 may then assign a daemon to perform the VPN establishment operation at time $t_0$ or $t_1$, for example, before the VPN is actually needed (e.g., at time $t_4$).

Best network matching: The disclosed anticipatory networking techniques may also match different user actions (and corresponding downstream operations) to advantageous networks, such that each corresponding data packet can be transmitted over the network that advantageously matches the action's specific needs. Indeed, some actions may be best suited for Wi-Fi (e.g., data intensive operations), while for other actions, cellular may be a suitable communication mode (e.g., when minimal amounts of data need to be transmitted). However, the quality of a particular network generally cannot be determined until data is actually transmitted over the network. Therefore, the anticipatory networking techniques disclosed herein allow for data corresponding to downstream operations to be transmitted over available networks during a proactive phase—e.g., before the data corresponding to those downstream operations is actually needed-such that the best possible network (s) are identified as early as possible.

Service-Edge Selection: Service-edge selection refers to the process of determining the ideal server(s) to send wirelessly-enabled device 210's various data requests. In some embodiments, wirelessly-enabled device 210 may maintain a latency map corresponding to various servers located across the world. Therefore, given certain pieces of information, such as wirelessly-enabled device 210's current location, and the detected user action, wirelessly-enabled device 210 can use this latency map to determine which server(s) to send the corresponding data requests. Again, using the anticipatory networking techniques disclosed herein, wirelessly-enabled device 210 can identify the ideal servers to service the necessary data requests before the data is actually needed.

Location Refresh: Using anticipatory networking, wirelessly-enabled device 210 may also be capable of determining whether the device's location needs to be refreshed, and if so, proactively performing the refresh operation. Indeed, wirelessly-enabled device 210 may automatically determine whether the device's last known location matches its current location, and if not, wirelessly-enabled device 210 may request its current latitude and longitudinal coordinates from server 130, before the location actually becomes needed to carry out user action 260.

Credential Refresh: Wirelessly-enabled device 210 may similarly use the anticipatory networking techniques disclosed herein to determine whether the user's credentials needs to be refreshed, and if so, proactively perform the refresh operation before the new credentials actually become needed to carry out user action 260.

Connection Pre-Flight Operations: In some embodiments, wirelessly-enabled device 210 may be able to use the anticipatory networking techniques disclosed herein to anticipate and proactively perform operations associated with any of the first five layers of the Open Systems Interconnection model (OSI model)—e.g., Physical layer. Data Link Layer, Network Layer, Transport Layer, and/or Session Layer. For example, wirelessly-enabled device 210 may anticipate and proactively perform Address Resolution Protocol (ARP) operations, Transmission Control Protocol (TCP) three-way handshake operations, and/or Transport Layer Security (TLS) operations. As such, Connection Pre-Flight Operations may include a variety of pre-requisite operations that may be required before actual content can be obtained from a particular server.

By anticipating and proactively performing certain downstream operations, wirelessly-enabled device 210 can reduce the risk of network failures, which in turn reduces application start-up times and refresh times. For example, the anticipatory networking techniques disclosed herein allow wirelessly-enabled device 210 to anticipate a Wi-Fi network failure, thus allowing wirelessly-enabled device 210 to switch to a cellular network without interrupting the performance of user action 260. Additionally, by proactively performing these downstream operations, wirelessly-enabled device 210 can also reduce unexpected delays caused by events such as dropped data packets.

In some embodiments, the anticipatory networking techniques disclosed herein can reduce overall network latency for a user action by approximately ten milliseconds up to approximately five to ten seconds (e.g., when wirelessly-enabled device 210 reaches the outer limits of networking element 220's communication range, and where data packets may be more prone to being dropped). However, the reduction in overall network latency may be less or more for other user actions based on the user, the device, the device condition, the user action, etc.

FIG. 3 is a graphical representation of an exemplary user profile 300, according to some embodiments. For illustrative purposes, the exemplary user profile 300 of FIG. 3 is described with reference to embodiments of FIG. 2. However, user profile 300 is not limited to these embodiments.

As discussed above, once wirelessly-enabled device 210 detects an interrupting event, the device 210 begins to collect several pieces of data relating to the interrupting event and to the current condition of wirelessly-enabled device 210. Such event-related data may include the type of event, parties involved in the event (e.g., automated or user initiated), device resources needed to carry out the action(s) requested by the interrupting event, and network resources needed to carry out the requested actions(s), to name just some examples. Additionally, data relating to the current condition of wirelessly-enabled device 210 may include, for example, the device's current location, the time of day where device 210 is located, whether device 210 is plugged in, or whether device 210 is in a moving vehicle.

After this data is collected, wirelessly-enabled device 210 may either use the collected data to build a new user profile relating to how the user typically interacts with wirelessly-enabled device 210 after the detecting the interrupting event, or wirelessly-enabled device 210 may compare the collected data to an existing user profile to determine how device 210 should respond to the detected interrupting event to best meet the user's needs. In other words, once a user profile has been built, wirelessly-enabled device 210 may use the collected data to anticipate what future operations will likely be needed in order to carry out the desired user action(s) or device action(s), or to handle an incoming third party) communication request (e.g., incoming SMS text message, phone call, or video call request).

User profile 300 is an exemplary representation of an existing user profile that may have been built by wirelessly-enabled device 210. In some embodiments, user profile 300 may represent a relational database (e.g., depicting the relationship between interrupting events and available downstream operations). However, the data comprising user profile 300 may also be stored in different ways without departing from the spirit and scope of the present disclosure.

User profile 300 may include an entry for every interrupting event that has taken place on wirelessly-enabled device 210. Additionally, or alternatively, user profile 300 may include an entry for less than all of the detected interrupting events. For example, user profile 300 may include an entry for an interrupting event only when that event has occurred more than a predetermined number of times. Nonetheless, interrupting event entries may be represented as a series of rows in a database—e.g., Event 1, Event 2, Event 3, Event 4, and Event N in FIG. 3. In some embodiments, Events 1, 2, . . . N may each represent an interrupting event, such as the user playing a song on wirelessly-enabled device 210, the user initiating a phone call, the user launching an application (e.g., a weather application, a map application, or a game), a third party sending an incoming phone call, SMS text message, email, or incoming video call request, or wirelessly-enabled device 210 automatically connecting to a known wireless access point, or automatically pinging a base station, to name just some examples.

Moreover, user profile 300 may also include an entry for every possible downstream operation that wirelessly-enabled device 210 may need to perform in order to carry out a particular interrupting event. Additionally, or alternatively, user profile 300 may include an entry for less than all of the possible downstream operations. For example, user profile 300 may include an entry for a downstream operation only when that operation has occurred more than a predetermined number of times. In any event, downstream operation entries may be represented as a series of columns in a database—e.g., Op 1. Op 2, Op 3, Op 4, Op 5, Op 6, and Op N in FIG. 3. In some embodiments. Ops 1, 2, . . . N may each represent a downstream operation, such as a DNS resolution, a TCP three-way handshake, a user credential request/refresh, a wirelessly-enabled device 210 location request/refresh, a VPN establishment, a service-edge selection, or the like.

Therefore, once an interrupting event occurs and wirelessly-enabled device 210 collects the available event-related data and device condition data, wirelessly-enabled device 210 may then consult user profile 300 to determine what, if any, anticipatory networking techniques can be implemented in order to reduce network latency associated with the detected interrupting event.

As an illustrative example, Event 1 may represent a user of wirelessly-enabled device 210 launching a map application, and Event 2 may represent wirelessly-enabled device 210 automatically connecting to a known wireless access point. Additionally, Op 1 may represent a location request operation, Op 2 may represent a VPN establishment operation, Op 3 may represent credential request operation, etc. . . . . In such a scenario, when wirelessly-enabled device 210 detects that the user has launched the map application, wirelessly-enabled device 210 may look up the first row in user profile 300 (illustrated as Event 1 in FIG. 3) to see which downstream operations are likely needed in order to successfully launch the map application. In doing so, wirelessly-enabled device 210 may determine that Op 1 (e.g., a location request operation), Op 3 (e.g., a credential request operation), Op 4, and Op 6 are likely needed. Therefore, wirelessly-enabled device 210 may initiate Ops 1, 3, 4, and 6 immediately after the interrupting event is detected, instead of waiting an indeterminate time period until the data corresponding to Ops 1, 3, 4, and 6 is actually requested.

Conversely, in a scenario where wirelessly-enabled device 210 automatically connects to a known wireless access point, the device may then look up the second row in user profile 300 (illustrated as Event 2 in FIG. 3) to see which downstream operations are likely needed in order to successfully connect to the access point. In doing so, wirelessly-enabled device 210 may determine that Op 2 (e.g., a VPN establishment operation), Op 3 (e.g., a credential request operation), Op 4, and Op 5 are likely needed. Therefore, wirelessly-enabled device 210 may initiate Ops 2-5 immediately after the interrupting event is detected, instead of having to wait until the data corresponding to Ops 2-5 is actually requested.

In some embodiments, to the extent possible, wirelessly-enabled device 210 may perform each downstream operation that is likely to be needed substantially simultaneously (e.g., immediately following the interrupting event), and may not have to perform the operations sequentially. Moreover, user profile 300 may represent a simplified version of the actual user profiles disclosed herein. For example, in some embodiments, Ops 1-N may be further broken down based on the current condition of wirelessly-enabled device 210 when the interrupting event is detected. In such instances, Op 1 may be performed in response to Event 1 under some device conditions (e.g., during daytime hours), but may not be performed under other device conditions (e.g., during nighttime hours). Therefore, user profile 300 is presented for illustrative purposes only, and is not intended to limit the spirit or scope of the present disclosure in anyway.

Figure 4:
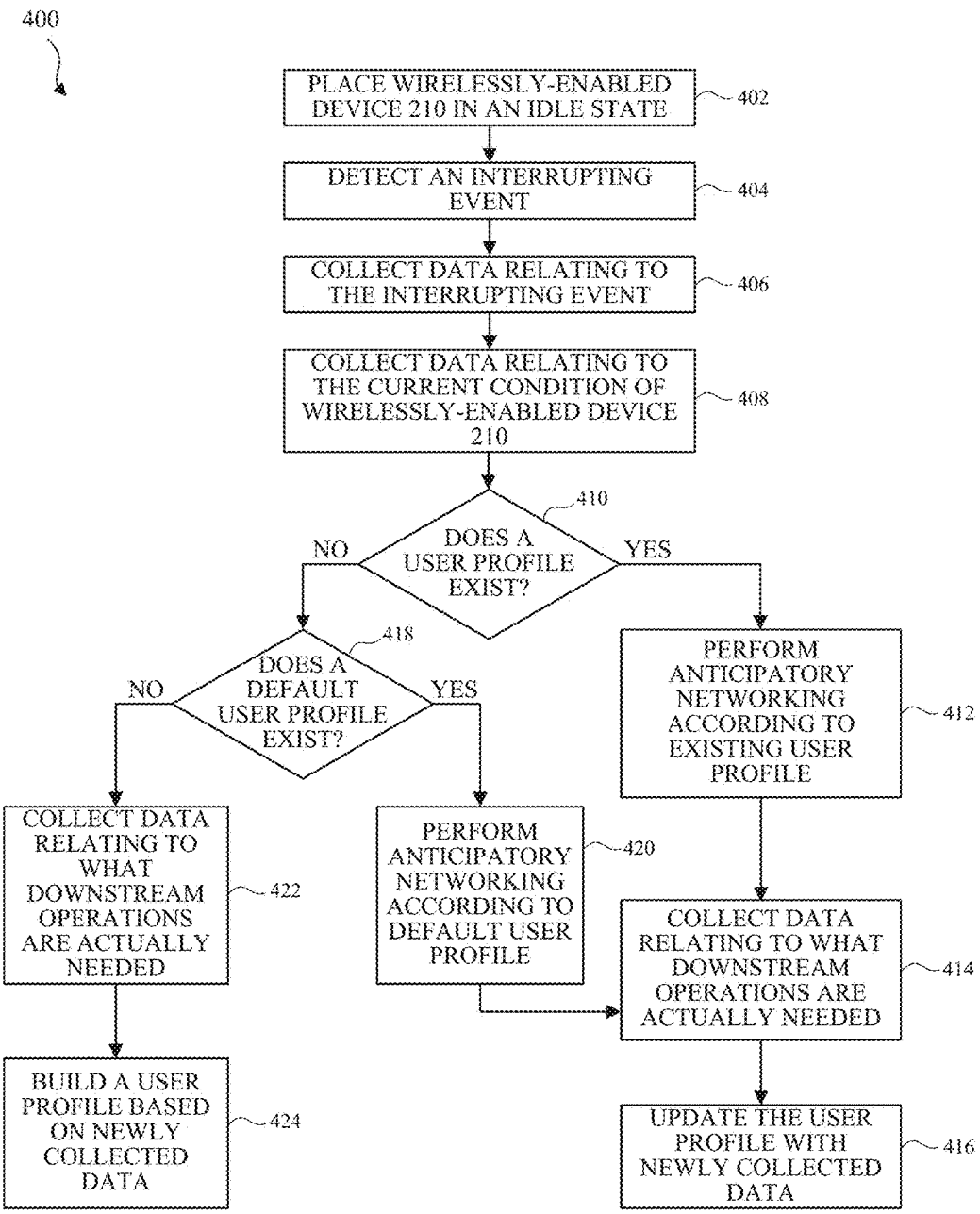
FIG. 4 is a flowchart of exemplary operational steps of performing anticipatory networking, according to some embodiments.

FIG. 4 is a flowchart or method 400 of exemplary operational steps of performing anticipatory) networking according some embodiments. This disclosure is not limited to this operational description. Rather, it will be apparent to persons skilled in the relevant art(s) from the teachings herein that other operational control flows are within the spirit and scope of the present disclosure. The following discussion describes the steps in FIG. 4. For illustrative purposes, the flowchart 400 of FIG. 4 is described with reference to embodiments of FIG. 2. However, flowchart 400 is not limited to these embodiments.

The method 400 begins with operation 402, where wirelessly-enabled device 210 is in an idle state. In some embodiments, the idle state may represent a state where a user of wirelessly-enabled device 210 is not currently interacting with the device, where wirelessly-enabled device 210 is not currently performing automated functions, such as automatically connecting to a known wireless access point, and where a third party individual is not currently attempting to communicate with the user through wirelessly-enabled device 210 (e.g., via an incoming phone call or an incoming SMS text message, or the like).

In operation 404, wirelessly-enabled device 210 may detect an interrupting event. As discussed previously herein, the interrupting event may represent, for example: (i) the user of wirelessly-enabled device 210 initiating an action on the device; (ii) a third party individual or device attempting to communicate with the user through wirelessly-enabled device 210; or (iii) wirelessly-enabled device 210 performing an automated function.

In operation 406, wirelessly-enabled device 210 may collect data relating to the interrupting event. Such event-related data may include the type of event, parties involved in the event (e.g., automated, single user, or multiple users), device resources needed to carry out the action(s) requested by the interrupting event, and network resources needed to carry out the requested actions(s), to name just some examples.

In operation 408, wirelessly-enabled device 210 may collect data relating to the current condition of the device. In some embodiments, the device condition data may include, for example, the device's current location, the time of day where the device is located, whether the device is plugged in, or whether the device is in a moving vehicle.

In operation 410, a determination is made as to whether a user profile already exists on wirelessly-enabled device 210. If it is determined in operation 410 that a user profile does already exist, then the operational flow proceeds to operation 412. In operation 412, wirelessly-enabled device 210 performs the anticipatory networking techniques disclosed herein in accordance with the existing user profile. For example, wirelessly-enabled device 210 may consult user profile 300 to determine what, if any, downstream operations can be proactively performed in order to reduce network latency associated with the detected interrupting event. Indeed, by anticipating and proactively performing the downstream operations identified in user profile 300 (e.g., anticipatory networking), wirelessly-enabled device 210 can reduce the risk of network failures, which in turn reduces application start-up times and refresh times. Additionally, by proactively performing these downstream operations, wirelessly-enabled device 210 can also reduce unexpected delays caused by events such as dropped data packets.

In operation 414, wirelessly-enabled device 210 may collect data relating to what downstream operations were actually needed to carry out the interrupting event (as opposed to what downstream operations were anticipated by user profile 300).

In operation 416, the existing user profile is updated to reflect the newly collected data from operation 414. For example, wirelessly-enabled device 210 may use the collected data relating to the interrupting event, to the condition of the device, and to the downstream operations that were actually needed to refine the entries in user profile 300. In some embodiments, updating user profile 300 may include adding entries into the user profile relating to new interrupting events, adding entries into user profile 300 relating to new downstream operations, or adjusting predetermined thresholds to reflect recent correct and/or incorrect downstream operation predictions. Additionally, or alternatively, updating user profile 300 may also include removing interrupting event entries and/or downstream operation entries in the event that those entries no longer accurately reflect the user's needs.

If, however, it is determined in operation 410 that a user profile does not exist, then the operational control flow proceeds to operation 418. In operation 418, a second determination is made as to whether a default user profile exists on wirelessly-enabled device 210. If it is determined in operation 418 that a default user profile does exist, then the operational flow proceeds to operation 420. In operation 420, wirelessly-enabled device 210 performs the anticipatory networking techniques disclosed herein in accordance with the default user profile. Following operation 420, the operational control flow may then proceed to operation 414 where wirelessly-enabled device 210 may collect data relating to what downstream operations were actually needed to carry out the interrupting event, and subsequently proceed to operation 416 where the default user profile may be updated to reflect the newly collected data.

If, however, it is determined in operation 418 that a default user profile does not exist, then the operational control flow proceeds to operation 422. In operation 422, wirelessly-enabled device 210 may again collect data relating to what downstream operations were actually needed to carry out the interrupting event. However, when it is determined in operation 418 that a default user profile does not exist, then wirelessly-enabled device 210 may be unable to perform the anticipatory networking techniques disclosed herein. In other words, without having a user profile (default or existing), wirelessly-enabled device 210 may not have a basis for predicting what downstream operations will likely be needed in order to carry out a desired user action.

In operation 424, wirelessly-enabled device 210 may then use the newly collected data to build a new user profile to be used for future anticipatory networking determinations.

Method 400 may therefore allow wirelessly-enabled device 210 to carry out numerous different actions, while also reducing the network latency associated with those actions, improving network reliability, and improving device performance.

Figure 5:
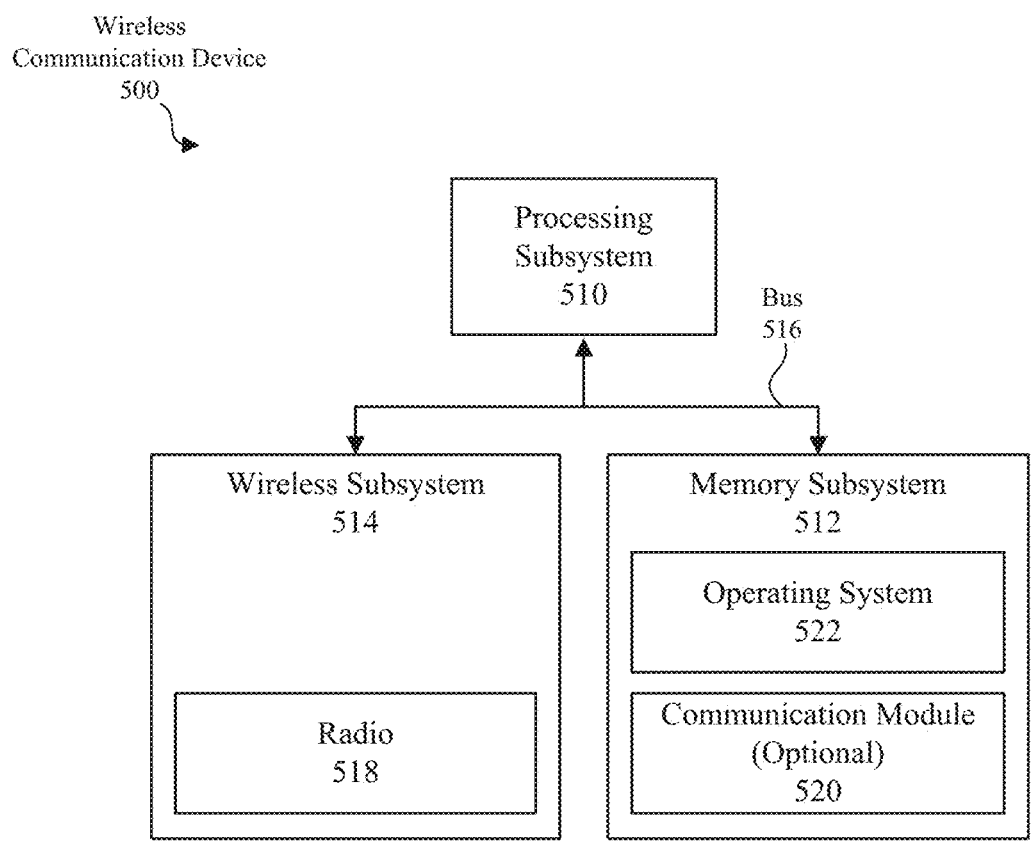
FIG. 5 illustrates a block diagram of a wirelessly-enabled device, according to some embodiments.

The internal components of first and second wirelessly-enabled devices 110 and 210 will now be described in further detail with references to FIG. 5. FIG. 5 illustrates a block diagram of a wireless communication device 500 according to some embodiments. Wireless communication device 500 may represent an exemplary embodiment of first and/or second wirelessly-enabled devices 110 and 210. Wireless communication device 500 may include a processing subsystem 510, a memory subsystem 512, and a wireless subsystem 514.

Processing subsystem 510 may include one or more devices that perform computational operations. For example, processing subsystem 510 can include one or more microprocessors, application-specific integrated circuits (ASICs), microcontrollers, and/or programmable-logic devices. Processing subsystem 510 may execute an operating system 522 (stored in memory subsystem 512) that includes procedures (or a set of instructions) for handling various basic system services for performing hardware-dependent tasks.

Memory subsystem 512 may include one or more devices for storing data and/or instructions for processing subsystem 510 and wireless subsystem 514. For example, memory subsystem 512 can include dynamic random access memory (DRAM), static random access memory (SRAM), and/or other types of memory. More generally, memory subsystem 512 may include volatile memory and/or non-volatile memory that are configured to store information. In addition, memory subsystem 512 can include mechanisms for controlling access to the memory. In some embodiments, memory subsystem 512 includes a memory hierarchy that comprises one or more caches coupled to a memory in wireless communication device 500. Additionally or alternatively, one or more of the caches may be located in processing subsystem 510.

Moreover, memory subsystem 512 may be coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by wireless communication device 500 as fast-access storage for often-used data, while the mass-storage device may be used to store less frequently used data.

Wireless subsystem 514 may include processors, controllers, radios/antennas, sockets/plugs, and/or other devices used for engaging in wireless communication with another wireless communication device—e.g., communicating packets or frames with another device via a wireless communication link—or with wireless access points, cellular base stations, and/or end servers. As discussed previously, those skilled in the relevant art(s) will recognize that wireless communication device 500 may be configured to communicate using any one of Wi-Fi, Bluetooth, radio-frequency identification (RFID), near field communications (NFC), 60 GHz communications, cellular communication, or the like, to name just some examples. Therefore, wireless subsystem 514 may be configured to enable communication with another wireless communication device, wireless access point, base station, or end server via any one of these wireless protocols. The mechanisms used for coupling to, communicating on, and handling data and events on the wireless link may be referred to collectively as an "interface" or "wireless interface" herein.

Within wireless communication device 500, processing subsystem 510, memory subsystem 512, and wireless subsystem 514 may be coupled together using bus 516. Bus 516 may be an electrical, optical, electro-optical, etc., connection that the subsystems can use to communicate commands and data among one another. Although wireless communication device 500 is shown with only one bus 516, a different number or configuration of electrical, optical, electro-optical, etc. connections among the subsystems is possible without departing from the spirit and scope of the present disclosure.

Similarly, wireless communication device 500 may be implemented as a standalone or a discrete device or may be incorporated within or coupled to another electrical device or host device, such as a cellphone, smartwatch, portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to name just some examples and/or any other suitable electronic device that will be apparent to those skilled in the relevant art(s) without departing from the spirit and scope of the present disclosure.

In an embodiment, wireless communication device 500 may include one or more additional processing subsystems 510, memory subsystems 512, and/or wireless subsystems 514. Additionally, it may be possible for one or more of these subsystems to be omitted from wireless communication device 500. Moreover, wireless communication device 500 may include one or more additional subsystems that are not shown in FIG. 5. For example, wireless communication device 500 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 5, some or all of a given subsystem can be integrated into one or more of the other subsystems in wireless communication device 500 and/or positions of components in wireless communication device 500 can be changed without departing from the spirit and scope of the present invention.

Now turning back to wireless subsystem 514. As illustrated in FIG. 5, wireless subsystem 514 may include radio 518, which itself may include hardware and/or software mechanisms that can be used for transmitting and receiving wireless signals to and from other wireless communication devices, wireless access points, cellular base stations, and/or end servers. Although wireless subsystem 514 is described having only a single radio 518, those skilled in the relevant art(s) will recognize that additional radios could also be included.

In an embodiment, wireless communication between device 500 and other wireless communication devices may be implemented using low-level hardware, such as in a physical layer, a link layer and/or a network layer in a network architecture. For example, wireless communication may, at least in part, be implemented in a media access control layer. However, in other embodiments at least some of the wireless communication operations are performed by one or more programs, modules, or sets of instructions (such as optional communication module 520 stored in memory subsystem 512), which may be executed by processing subsystem 510. The one or more programs may constitute a computer-program mechanism. Furthermore, instructions in the various modules in memory subsystem 512 may be implemented in: a high-level procedural language, an object-oriented programming language, and/or in an assembly or machine language. Note that the programming language may be compiled or interpreted, e.g., configurable or configured, to be executed by processing subsystem 510.

As discussed above, wireless communication device 500 may represent an exemplary embodiment of first and/or second wirelessly-enabled devices 110 and 210. In such scenarios, processing subsystem 510 may be configured to perform at least the following functions associated with the anticipatory networking method illustrated in FIG. 4: placing wireless communication device 500 in an idle state; detecting an interrupting event; collecting data relating to the interrupting event; collecting data relating to the current condition of wireless communication device 500; performing anticipatory networking according to a user profile 300 (processor-based aspects only); collecting data relating to what downstream operations are actually needed to carry out the detected interrupting event; and updating/building user profile 30X) based on the collected data.

Moreover, wireless subsystem 514 may be configured to perform at least the following function associated with the anticipatory networking method illustrated in FIG. 4: performing anticipatory networking according to a user profile 300 (network-based aspects only—e.g., communications with a networking element or end server).

The procedures (or set(s) of instructions) for performing the aforementioned functions may be included in operating system 522 stored in memory subsystem 512. Additionally, memory subsystem 512 may be configured to store various other forms of information that are used during the anticipatory networking method illustrated in FIG. 4, such as a default user profile, an existing user profile, and data that is locally cached to aid in the proactive performance of certain downstream operations (e.g., cached DNS resolutions, caches user credentials, or cached location data), to name just some examples.

In an embodiment, a tangible apparatus or article of manufacture comprising a tangible non-transitory computer useable or readable medium having control logic (software) stored thereon is also referred to herein as a computer program product or program storage device. This includes, but is not limited to, processing subsystem 510, memory subsystem 512, operating system 522, and communication module 520, as well as tangible articles of manufacture embodying any combination of the foregoing. Such control logic, when executed by one or more data processing devices (such as processing system 510), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

Additionally, embodiments of the disclosure may be implemented in hardware, firmware, software, or any combination thereof. Embodiments of the disclosure may also be implemented as instructions stored on a non-transitory machine-readable medium, which may be read and executed by one or more processors. A non-transitory machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices, electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

It is to be appreciated that the Detailed Description section, and not any other section, is intended to be used to interpret the claims. Other sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, in a wirelessly-enabled device, for performing anticipatory networking, comprising:
    detecting an interrupting event;
    collecting first data relating to the interrupting event;
    collecting second data relating to a condition of the wirelessly-enabled device; and
    proactively performing one or more downstream operations corresponding to the interrupting event,
    wherein the one or more downstream operations are proactively performed based at least in part on a combination of a likelihood that the one or more downstream operations will be needed in order to carry out the interrupting event and a cost of performing the one or more downstream operation satisfying a predetermined threshold, and
    wherein the one or more downstream operations are proactively performed before third data corresponding to the one or more downstream operations is requested.

2. The method of claim 1, wherein a user profile identifies the likelihood that the one or more downstream operations will be needed in order to carry out the interrupting event.

3. The method of claim 2, wherein the likelihood that the one or more downstream operations will be needed in order to carry out the interrupting event comprises at least one of a percentage chance of the one or more downstream operations occurring and a total number of times that the one or more downstream operations have occurred.

4. The method of claim 1, further comprising:
    collecting fourth data relating to downstream operations that are actually performed in response to the interrupting event; and
    updating the predetermined threshold based at least in part on the first, second, and fourth data.

5. The method of claim 1, further comprising:
    collecting fourth data relating to downstream operations that are actually performed in response to the interrupting event; and
    updating a user profile based at least in part on the first, second, and fourth data.

6. The method of claim 5, wherein the user profile is an existing user profile.

7. The method of claim 5, wherein the user profile is a default user profile.

8. The method of claim 1, wherein the interrupting event includes at least one of a user action taken on the wirelessly-enabled device, a third party action implicating the wirelessly-enabled device, and the wirelessly-enabled device performing an automated function.

9. The method of claim 8, wherein the one or more downstream operations includes at least one of a DNS resolution, a VPN establishment operation, a credential request operation, a location request operation, a best network matching operation, a service-edge selection operation, and a connection pre-flight operation.

10. A wirelessly-enabled device, comprising:
a processor; and
memory;
the processor and memory configured to perform operations, the operations comprising:
detecting an interrupting event;
collecting first data relating to the interrupting event;
collecting second data relating to a condition of the wirelessly-enabled device; and
proactively performing one or more downstream operations corresponding to the interrupting event,
wherein the one or more downstream operations are proactively performed based at least in part on a combination of a likelihood that the one or more downstream operations will be needed in order to carry out the interrupting event and a cost of performing the one or more downstream operation satisfying a predetermined threshold, and
wherein the one or more downstream operations are proactively performed before third data corresponding to the one or more downstream operations is requested.

11. The wirelessly-enabled device of claim 10, wherein the likelihood that the one or more downstream operations will be needed in order to carry out the interrupting event comprises at least one of a percentage chance of the one or more downstream operations occurring and a total number of times that the one or more downstream operations have occurred.

12. The wirelessly-enabled device of claim 10, wherein the operations performed by the processor and memory further comprise:
collecting fourth data relating to downstream operations that are actually performed in response to the interrupting event; and
updating a user profile based at least in part on the first, second, and fourth data.

13. The wirelessly-enabled device of claim 10, wherein the interrupting event includes at least one of a user action taken on the wirelessly-enabled device, a third party action implicating the wirelessly-enabled device, and the wirelessly-enabled device performing an automated function.

14. The wirelessly-enabled device of claim 10, wherein the one or more downstream operations includes at least one of a DNS resolution, a VPN establishment operation, a credential request operation, a best network matching operation, a service-edge selection operation, and a connection pre-flight operation.

15. The wirelessly-enabled device of claim 13, wherein the user action taken on the wirelessly-enabled device includes at least one of playing a song, initiating a phone call, launching an application, scrolling through a list of contacts, swiping to an alternate page of icons, and unlocking the wirelessly-enabled device.

16. A non-transitory computer-readable medium having instructions stored thereon that, when executed by at least one computing device, causes the at least one computing device to perform operations comprising:
detecting an interrupting event;
collecting first data relating to the interrupting event;
collecting second data relating to a condition of a wirelessly-enabled device;
proactively performing one or more downstream operations corresponding to the interrupting event,
wherein the one or more downstream operations are proactively performed based at least in part on a combination of a likelihood that the one or more downstream operations will be needed in order to carry out the interrupting event and a cost of performing the one or more downstream operation satisfying a predetermined threshold, and
wherein the one or more downstream operations are proactively performed before third data corresponding to the one or more downstream operations is requested; and
updating a user profile based at least in part on the collected first and second data.

17. The non-transitory computer-readable medium of claim 16, wherein the user profile identifies the likelihood that the one or more downstream operations will be needed in order to carry out the interrupting event.

18. The non-transitory computer-readable medium of claim 17, wherein the likelihood that the one or more downstream operations will be needed in order to carry out the interrupting event comprises at least one of a percentage chance of the one or more downstream operations occurring and a total number of times that the one or more downstream operations have occurred.

19. The non-transitory computer-readable medium of claim 16, wherein the interrupting event includes at least one of a user action taken on the wirelessly-enabled device, a third party action implicating the wirelessly-enabled device, and the wirelessly-enabled device performing an automated function.

20. The non-transitory computer-readable medium of claim 16, wherein the one or more downstream operations includes at least one of a DNS resolution, a VPN establishment operation, a credential request operation, a location request operation, a best network matching operation, a service-edge selection operation, and a connection pre-flight operation.

* * * * *

UNITED STATES PATENT AND TRADEMARK OFFICE
CERTIFICATE OF CORRECTION

PATENT NO. : 10,129,772 B1  
APPLICATION NO. : 15/594737  
DATED : November 13, 2018  
INVENTOR(S) : Franco Travostino Page 1 of 1

It is certified that error appears in the above-identified patent and that said Letters Patent is hereby corrected as shown below:

In the Claims

In Column 20, Line 35, please replace "one or more downstream operation" with --one or more downstream operations--.

In Column 21, Line 25, please replace "one or more downstream operation" with --one or more downstream operations--.

In Column 22, Line 23, please replace "one or more downstream operation" with --one or more downstream operations--.

Signed and Sealed this  
Sixteenth Day of April, 2019

Andrei Iancu  
*Director of the United States Patent and Trademark Office*